(12) United States Patent
Hattori et al.

(10) Patent No.: US 7,595,458 B2
(45) Date of Patent: Sep. 29, 2009

(54) ELECTRONIC APPARATUS

(75) Inventors: Masahiko Hattori, Kawasaki (JP);
Masuo Ohnishi, Kawasaki (JP); Yuji Aoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/218,077

(22) Filed: Jul. 11, 2008

(65) Prior Publication Data

US 2008/0296134 A1   Dec. 4, 2008

Related U.S. Application Data

(63) Continuation of application No. PCT/JP2006/300282, filed on Jan. 12, 2006.

(51) Int. Cl.
*H01H 3/12* (2006.01)
(52) U.S. Cl. .................... 200/302.1; 200/341
(58) Field of Classification Search ........... 200/302.1, 200/302.2, 512, 310–315, 341–345; 400/496, 400/490, 472
See application file for complete search history.

(56) References Cited

U.S. PATENT DOCUMENTS

| 4,948,281 | A | * | 8/1990 | Werner | 400/472 |
|---|---|---|---|---|---|
| 5,734,136 | A | * | 3/1998 | Newcomer et al. | 200/5 A |
| 6,610,944 | B2 | * | 8/2003 | Lee et al. | 200/302.1 |
| 6,644,874 | B2 | * | 11/2003 | Tsai | 400/490 |
| 6,971,807 | B2 | * | 12/2005 | Tsai et al. | 400/472 |
| 6,995,975 | B2 | * | 2/2006 | Hamada et al. | 361/680 |
| 7,385,808 | B2 | * | 6/2008 | Hamada et al. | 361/680 |
| 7,390,983 | B2 | * | 6/2008 | Mizuno et al. | 200/61.7 |

FOREIGN PATENT DOCUMENTS

| JP | 63-50417 | 4/1988 |
|---|---|---|
| JP | 2001-228950 | 8/2001 |

(Continued)

OTHER PUBLICATIONS

International Preliminary Report on Patentability and English Translation of Written Opinion of the International Searching Authority issued in corresponding International Patent Application No. PCT/JP2006/300282; mailed on Jul. 24, 2008.

(Continued)

*Primary Examiner*—Michael A Friedhofer
*Assistant Examiner*—Lisa N Klaus
(74) *Attorney, Agent, or Firm*—Fujitsu Patent Center (57) ABSTRACT

An enclosure has an edge for defining a window opening. A keyboard is set in the window opening. A support member attached to the enclosure from the inside of the enclosure to receive the edge of the enclosure and the keyboard. A wall stands upright from the surface of the support member at a position outside the window opening. When coffee is spilled on the keyboard, the liquid flows into a space between the keyboard and the window opening. The surface tension of the liquid serves to prevent the liquid from immediately leaking outside the window opening through the gap between the edge and the support member. The liquid then starts leaking outside the window opening through the gap. The wall of the support member blocks the liquid. It thus takes a while before the liquid flows over the wall.

9 Claims, 6 Drawing Sheets

FOREIGN PATENT DOCUMENTS

| | | |
|---|---|---|
| JP | 2002-352659 | 12/2002 |
| JP | 2003-122454 | 4/2003 |
| JP | 2003-317170 | 11/2003 |
| JP | 2004-121071 | 4/2004 |

OTHER PUBLICATIONS

International Search Report mailed Jan. 31, 2006 in connection with the International application No. PCT/JP2006/300282.

* cited by examiner

ELECTRONIC APPARATUS

CROSS REFERENCE TO RELATED APPLICATIONS

This is a continuing application, filed under 35 U.S.C. §111(a), of international Application PCT/JP2006/300282, filed Jan. 12, 2006, the contents of which are incorporated herein by reference.

BACKGROUND OF THE INVENTION

1. Field of the Invention

The present invention relates to an electronic apparatus including: an enclosure having a window opening; and a keyboard set in the window opening.

2. Description of the Prior Art

A notebook personal computer includes a keyboard. The keyboard is set in a window opening defined in the front surface of the enclosure as disclosed in Japanese Patent Application Publication No. 2002-352659, for example. The keyboard includes a support plate supporting keypads. A surrounding wall stands upright from the surface of the support plate along the outer periphery of the support plate. When liquid is spilled on the keyboard, for example, the liquid is blocked by the surrounding wall. The liquid is in this manner prevented from flowing into the inner space of the enclosure through a gap between the keyboard and the edge of the window opening.

However, when a user spills coffee, for example, on the keyboard during the user's operation on the notebook personal computer, the coffee can flow outside the surrounding wall. The coffee immediately flows into the inner space of the enclosure through the gap between the keyboard and the edge of the window opening. A motherboard can be drowned in the enclosure. A short circuit can be caused on the motherboard. In the case where the user is creating data such as a document file with application software, for example, the data can be lost.

SUMMARY OF THE INVENTION

It is accordingly an object of the present invention to provide an electronic apparatus enabling delay of inflow of liquid into the inner space of an enclosure.

According to the present invention, there is provided an electronic apparatus comprising: an enclosure having an edge for defining a window opening; a keyboard set in the window opening along the edge of the enclosure; a support member attached to the enclosure from an inside of the enclosure, the support member having a surface receiving the edge of the enclosure and the keyboard; and a wall standing upright from the surface of the support member at a position outside the window opening.

When liquid such as coffee is spilled on the keyboard during a user's operation on the electronic apparatus, for example, the liquid flows into a space between the keyboard and the window opening. The keyboard and the edge of the enclosure are received on the support member. Even if there is a gap between the edge and the support member, the surface tension of the liquid serves to prevent the liquid from immediately leaking outside the window opening through the gap between the edge and the support member. The liquid then starts gradually leaking outside the window opening, or leaking into the inner space of the enclosure, through the gap between the edge and the support member. The wall of the support member blocks the liquid. The liquid is gradually accumulated in a space between the edge and the wall. It thus takes a while before the liquid flows over the wall. This results in delay of inflow of the liquid into the inner space of the enclosure. The user can save data prior to inflow of the liquid, for example. The data can be prevented from being lost.

The keyboard may include; keypads arranged along an imaginary plane; a waterproof support plate supporting the keypads; and a surrounding wall standing upright from the outer periphery of the waterproof support plate.

The electronic apparatus allows preventing the keypads from immersion of the liquid with the assistance of the waterproof support plate, for example. The liquid on the surface of the waterproof support plate spills out of the outer periphery of the waterproof support plate. The surrounding wall stands upright from the outer periphery of the waterproof support plate. The surrounding wall thus blocks the liquid. The liquid flowing over the surrounding wall is accumulated in a gap between the surrounding wall and the window opening. The surface tension of the liquid serves to prevent the liquid from immediately flowing outside the window opening, or flowing into the inner space of the enclosure, through the gap between the edge and the support member. Likewise, the liquid is accumulated in a space between the edge and the wall. It thus takes a while before the liquid flows over the wall. The liquid is prevented from immediately flowing from the keyboard into the enclosure in the electronic apparatus. Here, the edge of the enclosure may be placed at a position between the wall of the support member and the surrounding wall of the waterproof support plate.

The electronic apparatus may comprise a heat generating component placed below the support member. Likewise, the electronic apparatus may further comprise a heat generating component connected to the support member. The support member may be a heat radiating plate capable of radiating heat generated at the heat generating component.

The support member or heat radiating plate allows efficient radiation of the heat of the heat generating component. The heat generating component is prevented from a rise in the temperature. The heat generating component is thus prevented from receiving any damages. The support member, enabling prevention of inflow of the liquid into the inner space of the enclosure, also serves to radiate the heat of the heat generating component. This results in a reduction in the number of components in the electronic apparatus. The production cost of the electronic apparatus is thus suppressed. The electronic apparatus is also allowed to enjoy a reduced weight. The electronic apparatus is also allowed to enjoy a simplified structure. The electronic apparatus can thus be made in a relatively facilitated manner.

The electronic apparatus may further comprise a detection circuit designed to detect liquid inside the window opening. When liquid is spilled on the keyboard of the electronic apparatus, the liquid flows into a space between the keyboard and the window opening. The detection circuit detects the inflow of the liquid inside the window opening. The detection of the liquid is notified to a user, for example. The user can save data prior to inflow of the liquid into the inner space of the enclosure, for example. The data can be prevented from being lost.

The electronic apparatus may further comprise a controller circuit establishing a predetermined silent state of the electronic apparatus when the detection circuit detects liquid. The controller circuit operates to automatically establish the silent state of the electronic apparatus, for example. A user is refrained from operating the electronic apparatus even when the silent state is to be established. The silent state may include a state where the saving operation of data has been completed, for example.

The electronic apparatus may further comprise a hard disk drive. The aforementioned controller circuit may establish a predetermined silent state of the hard disk drive when the detection circuit detects liquid. When the silent state is established in the hard disk drive, a head slider may be positioned at a predetermined unload position, for example. A so-called ramp member may be employed to hold the head slider outside a magnetic recording disk, for example. The head slider is in this manner reliably prevented from collision against the magnetic recording disk. Even if the supply of power stops, the hard disk drive is reliably prevented from receiving damages. In the case where the supply of power accidentally stops during the operation of the hard disk drive, for example, the magnetic recording disk stops rotating while the flying head slider flies above the magnetic recording disk. The head slider thus inevitably collides against the surface of the magnetic recording disk. The hard disk drive is damaged.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
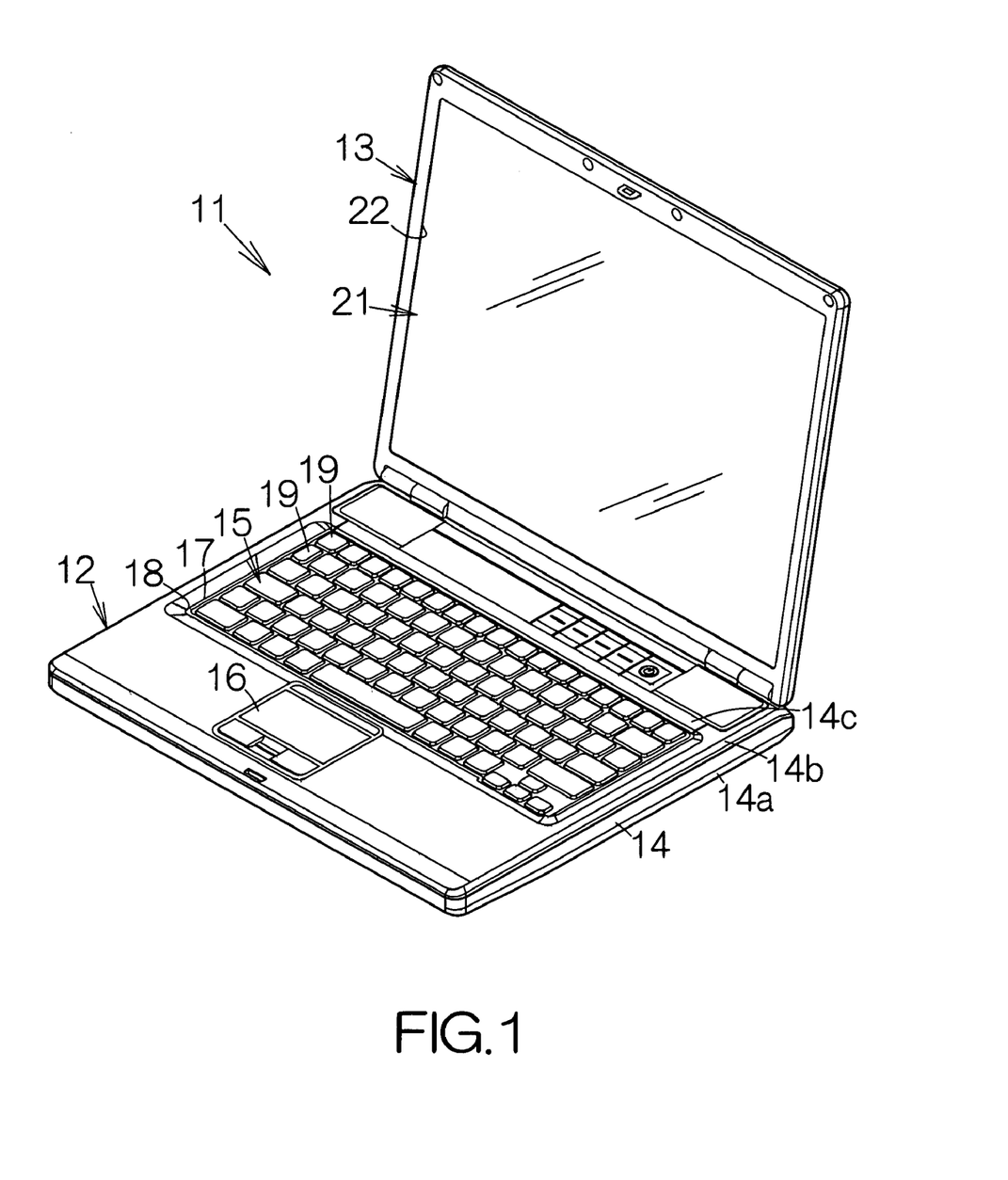
FIG. 1 is a perspective view schematically illustrating a notebook personal computer as a specific example of an electronic apparatus according to the present invention.

FIG. 1 schematically illustrates a notebook personal computer 11 as a specific example of an electronic apparatus according to the present invention. The notebook personal computer 11 includes a thin main body 12 and a display enclosure 13. The display enclosure 13 is coupled to the main body 12 for relative swinging or pivotal movement. The display enclosure 13 can be superposed on the main body 12 through the pivotal movement relative to the main body 12.

The main body 12 includes an enclosure 14. The enclosure 14 may be made of a resin material such as polycarbonate, for example. A molding process may be employed to form the enclosure 14, for example. The enclosure 14 includes a base 14a, a front cover 14b and a rear cover 14c. The front cover 14b is removably coupled to the base 14a. The rear cover 14c is likewise removably coupled to the base 14a. The front cover 14b and the rear cover 14c in combination define the front surface of the enclosure 14 thereon. The front cover 14b functions as a so-called palm rest.

Input devices such as a keyboard 15 and a pointing device 16 are embedded in the front surface of the enclosure 14. The keyboard 15 is set in a window opening 18 defined along an edge 17 of the front cover 14b and an edge 17 of the rear cover 14c, for example. The keyboard 15 includes keypads 19, 19, . . . arranged along an imaginary plane. Users manipulate the keyboard 15 and/or the pointing device 16 to input commands and/or data.

A liquid crystal display (LCD) panel module 21 is incorporated in the display enclosure 13, for example. The screen of the LCD panel module 21 gets exposed in a window opening 22 defined in the display enclosure 13. Text data and graphics appear on the screen. Users can see the ongoing operation of the notebook personal computer 11 based on the appearing text data and graphics.

Figure 2:
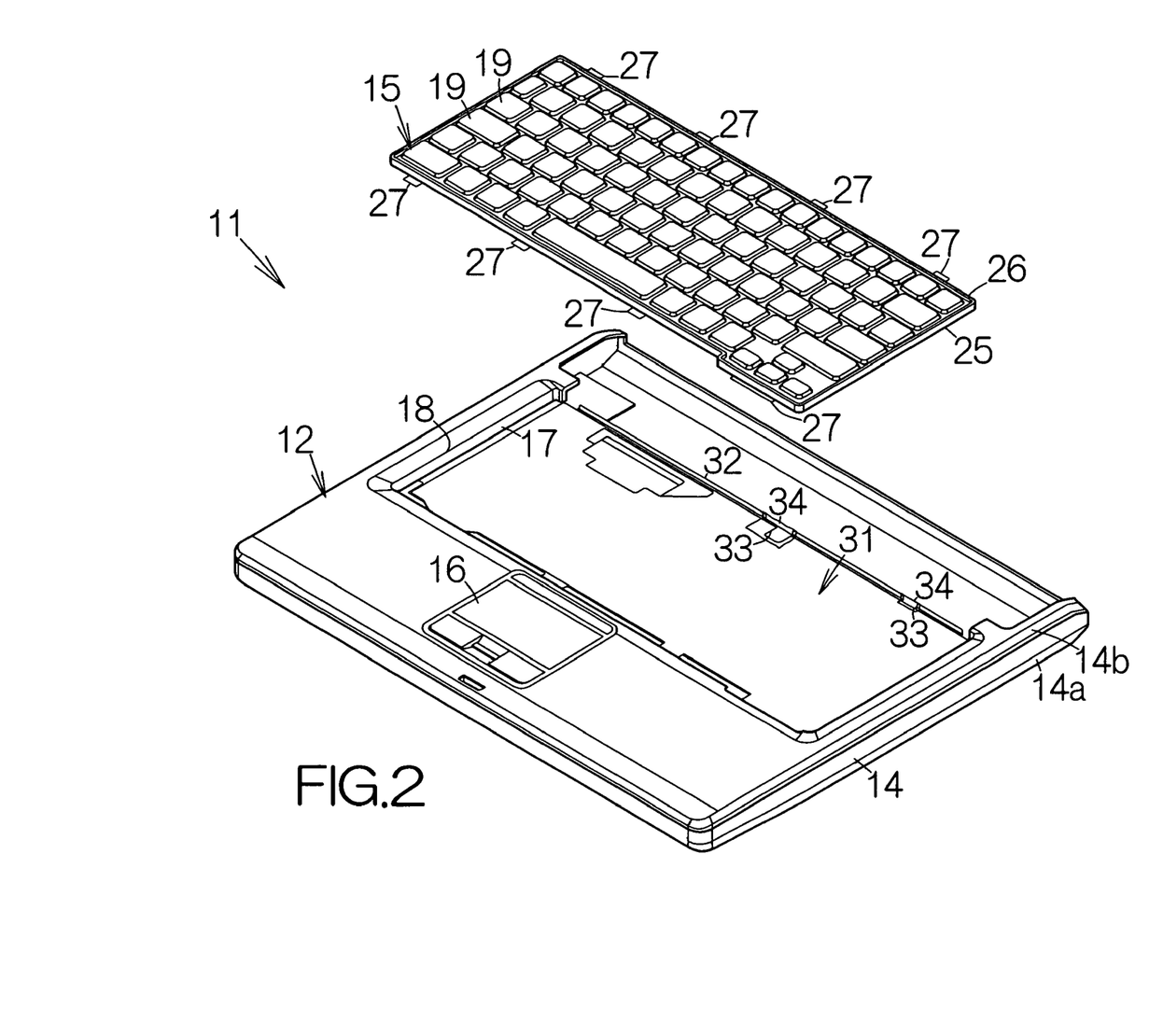
FIG. 2 is an exploded view schematically illustrating the structure of a main body.

As shown in FIG. 2, the keyboard 15 includes a waterproof support member or plate 25. The keypads 19, 19, . . . are supported on the front surface of the waterproof support plate 25. A flexible printed circuit board (FPC) is incorporated in the waterproof support plate 25 to establish contact points for the respective keypads 19, for example. The flexible printed circuit board is covered with a resin material, for example. The waterproof support plate 25 is thus prevented from immersion of the liquid. The liquid flows to the outer periphery of the waterproof support plate 25. A surrounding wall 26 stands upright from the outer periphery of the waterproof support plate 25. The surrounding wall 26 endlessly surrounds the waterproof support plate 25 at the outer periphery of the waterproof support plate 25.

Tabs or tongues 27, 27, . . . are formed at the outer peripheral surface of the waterproof support plate 25. The tabs 27, 27, . . . may be formed integral with the waterproof support plate 25. As is apparent from FIG. 2, the rear cover 14c is removed from the base 14a when the keyboard 15 is to be removed. When the keyboard 15 is set in the window opening 18, the edge 17 of the front cover 14b and the edge 17 of the rear cover 14c are received on the surfaces of the tabs 27. The keyboard 15 is in this manner prevented from dropping out of the window opening 18.

A plate-shaped support member, namely a heat radiating plate 31, is placed in the window opening 18. The heat radiating plate 31 may extend in parallel with the bottom surface of the waterproof support plate 25, for example. The edge 17 of the rear cover 14c and the keyboard 15 are received on the surface of the heat radiating plate 31. The heat radiating plate 31 is attached to the rear cover 14c from the inside of the enclosure 14, for example. The heat radiating plate 31 may be made of a metal plate such as an aluminum plate, for example. A pressing process may be employed to form the heat radiating plate 31, for example.

The heat radiating plate 31 defines walls 32 thereon. The walls 32 stand upright from the surface of the heat radiating plate 31. Here, the walls 32 are defined along the rear edge of the heat radiating plate 31. The walls 32 can be formed during the aforementioned pressing process. Recesses 33, 33 are formed in the rear edge of the heat radiating plate 31 so that the walls 32 are separated from each other. Tapes 34 made of a resin material are utilized to close the recesses 33, 33, respectively, for example. The tapes 34 serve to establish the continuity of the walls 32 from one end to the other end of the edge 17 of the rear cover 14c.

Figure 3:
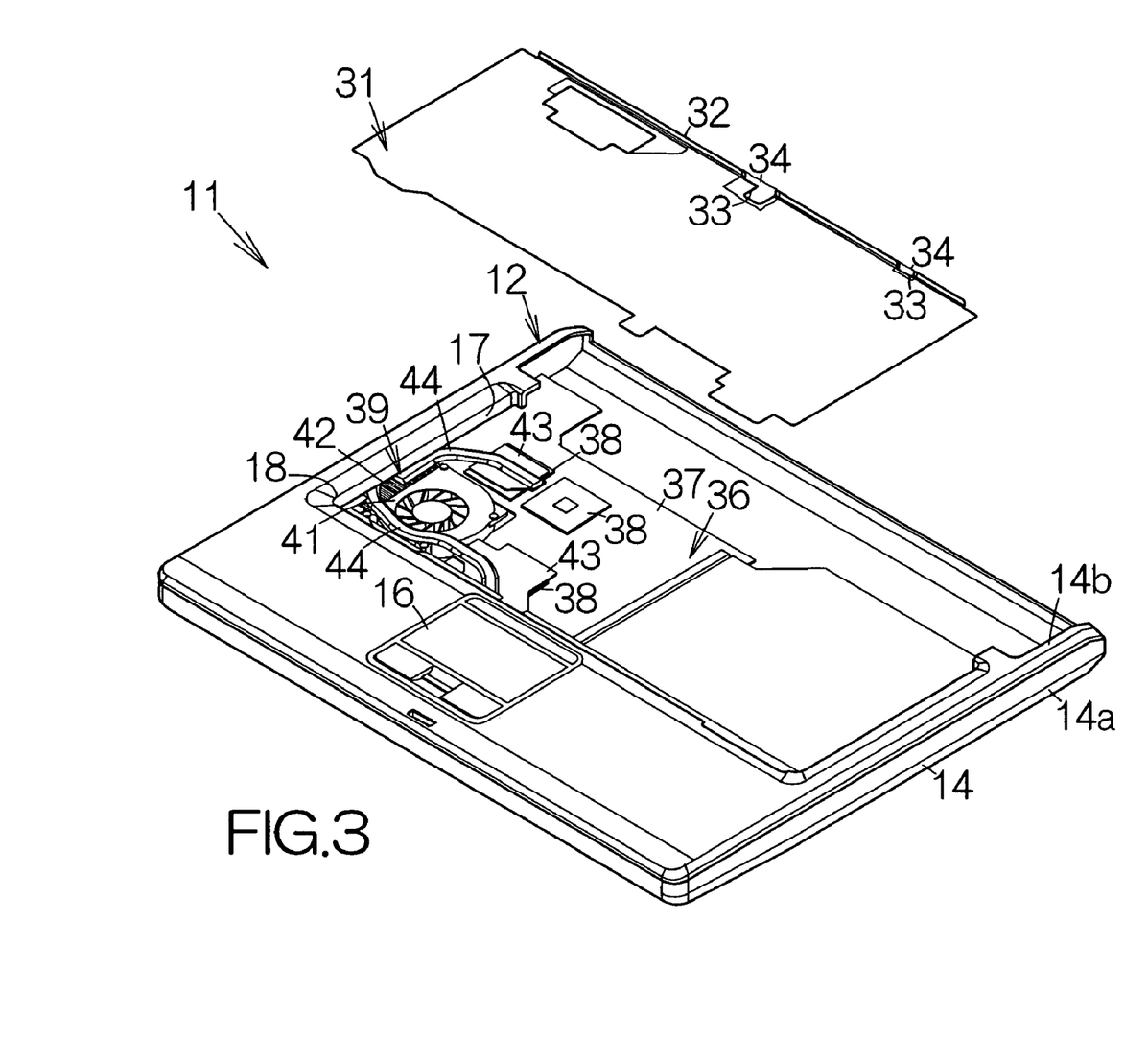
FIG. 3 is an exploded view schematically illustrating the structure of the main body.

As shown in FIG. 3, a printed circuit board unit, namely a motherboard 36, is enclosed in the inner space of the main body 12. The motherboard 36 includes a printed wiring board, and heat generating elements, namely large-scale integrated circuit (LSI) packages 38, 38, . . . The LSI packages 38, 38, . . . are mounted on the surface of the printed wiring board 37. The LSI packages 38, 38, . . . individually include a central processing unit (CPU) and/or a video chip mounted on a small-sized ceramic substrate, for example.

The CPU is designed to execute processing based on an operating system (OS) and/or application software, for example. The video chip is designed to execute image processing based on the processing of the CPU chip, for example. The operating system and/or the application software may be stored in a mass storage such as a hard disk drive (HDD), not shown, likewise enclosed in the main body 12. The CPU is designed to output an instruction signal to the hard disk drive for writing/reading of information data.

A cooling apparatus 39 is connected to the LSI packages 38. The cooling apparatus 39 includes a fan unit 41 and a heat radiating fin member 42. The fan unit 41 is designed to generate airflow. The heat radiating fin member 42 is exposed to the airflow of the fan unit 41. The heat radiating fin member 42 includes heat radiating fins extending in parallel with one another, for example. An airflow passage is defined between the adjacent ones of the heat radiating fins. The airflow running through the airflow passage enables discharge of heat of the heat radiating fin member 42 out of the enclosure 14.

A thermal conductive plate 43 is placed on the individual LSI package 38. The thermal conductive plate 43 and the heat radiating fin member 42 are connected to each other through a heat pipe 44. The aforementioned heat radiating plate 31 is overlaid on the LSI packages 38 and the heat pipe 44. The LSI packages 38 and the heat pipe 44 are in this manner connected to the heat radiating plate 31. Heat is transferred from the thermal conductive plate 43 to the heat radiating fin member 42 and the heat radiating plate 31 through the heat pipe 44. The heat of the CPU chip and/or the video chip is radiated from the heat radiating fin member 42 and the heat radiating plate 31.

It should be noted that the LSI packages 38 and the heat pipe 44 may simply be placed below the heat radiating plate 31, for example. Specifically, the LSI packages 38 and the heat pipe 44 may not directly contact with the heat radiating plate 31. The heat of the CPU chip and/or the video chip may be transferred to the heat radiating plate 31 through the atmosphere in this manner.

Figure 4:
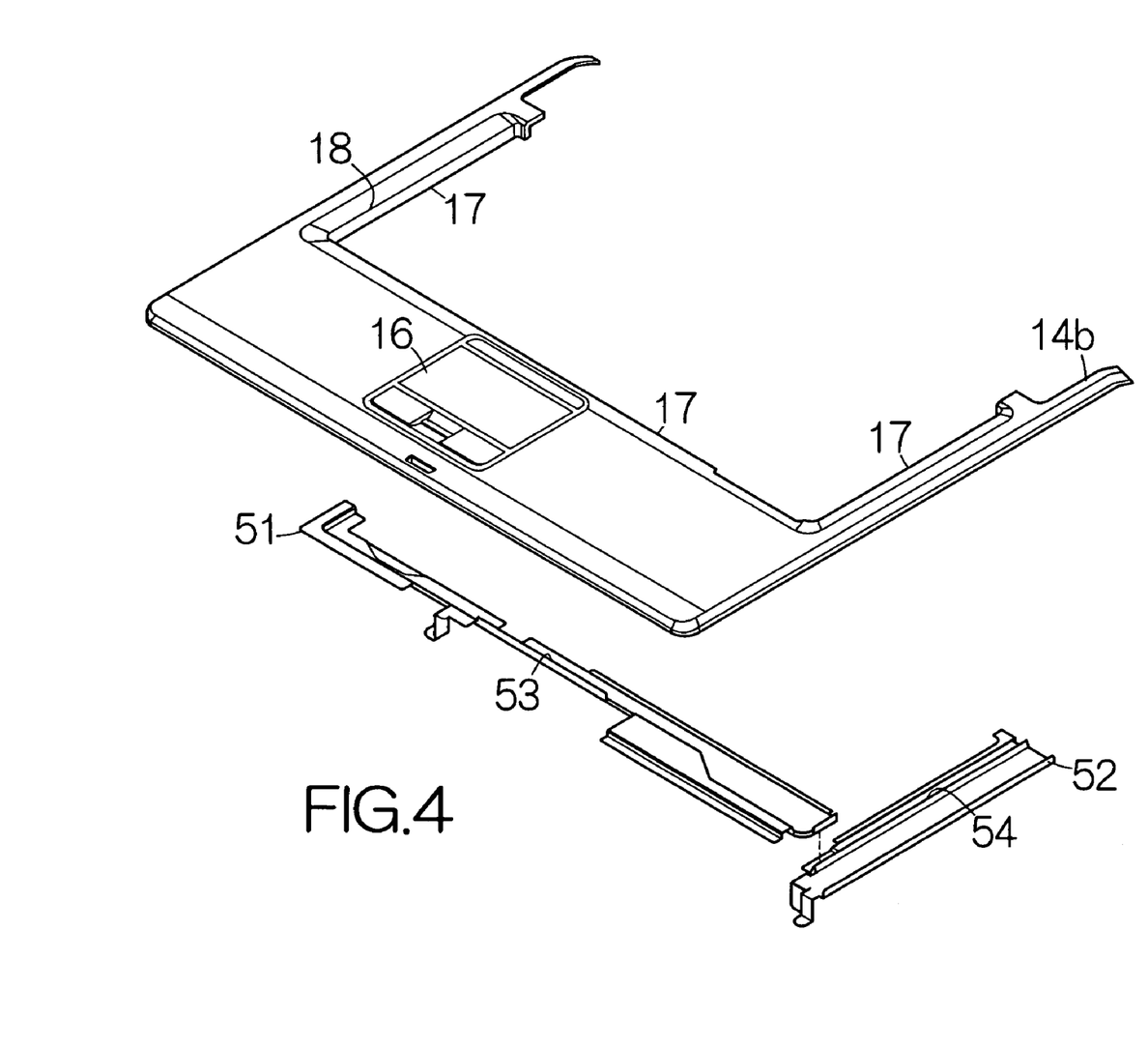
FIG. 4 is an exploded view schematically illustrating the structure of a front cover.

As shown in FIG. 4, support members, namely a front metal member 51 and a side metal member 52, are attached to the front cover 14b at the backside of the front cover 14b. The front metal member 51 and the side metal member 52 may be made out of a metal plate such as an aluminum plate, for example. A pressing process may be employed to form the front metal member 51 and the side metal member 52, for example. The edge 17 of the front cover 14b and the keyboard 15 are received on the surfaces of the front metal member 51 and the side metal member 52.

The front metal member 51 extends along the edge 17 on the foreside of the window opening 18. The front metal member 51 defines a wall 53 thereon. The wall 53 stands upright from the surface of the front metal member 51. The wall 53 continuously extends from one end to the other end of the edge 17. The side metal member 52 extends along the edge 17 on the side of the window opening 18. The side metal member 52 defines a wall 54 thereon. The wall 54 stands upright from the surface of the side metal member 52. The wall 54 is designed to continuously extend from one end to the other end of the edge 17.

Figure 5:
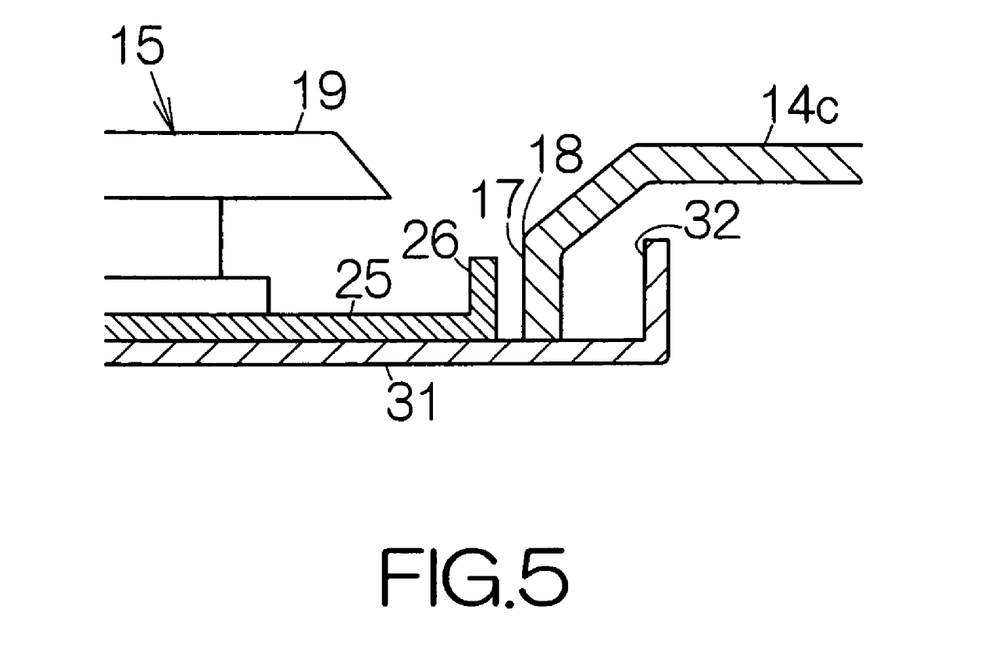
FIG. 5 is an enlarged partial sectional view schematically illustrating the edge of a window opening defined in the main body.

As is apparent from FIG. 5, the waterproof support plate 25 of the keyboard 15 and the edge 17 of the rear cover 14c are received on the heat radiating plate 31. The bottom surface of the waterproof support plate 25 is in contact with the surface of the heat radiating plate 31. The wall 32 of the heat radiating plate 31 stands upright from the surface of the heat radiating plate 31 at a position outside the window opening 18. The inward surface of the wall 32 is opposed to the outward surface of the edge 17 of the rear cover 14c. A gap is formed between the inward surface of the edge 17 and the outward surface of the surrounding wall 26 of the keyboard 15.

Figure 6:
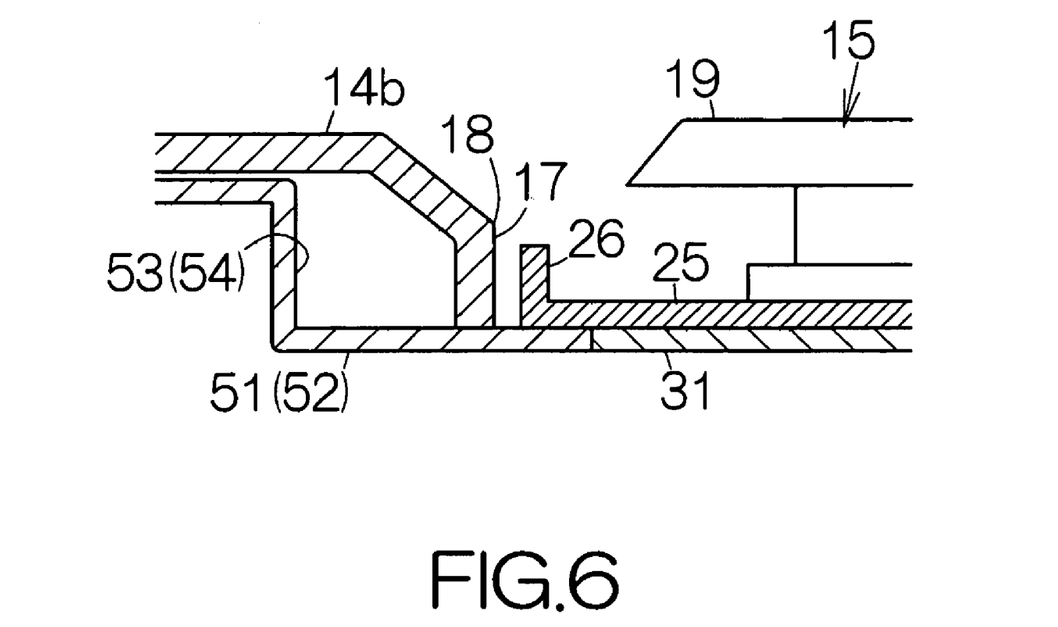
FIG. 6 is an enlarged partial sectional view schematically illustrating the edge of the window opening.

As is apparent from FIG. 6, the waterproof support plate 25 and the edge 17 of the front cover 14b are received on the front metal member 51 (the side metal member 52). The bottom surface of the waterproof support plate 25 is in contact with the surface of the front metal member 51. The wall 53 of the front metal member 51 (the wall 54 of the side metal member 52) stands upright from the surface of the front metal member 51 at a position outside the window opening 18. The inward surface of the wall 53 is opposed to the outward surface of the edge 17. A gap is formed between the outward surface of the surrounding wall 26 and the inward surface of the edge 17.

Now, assume that liquid is spilled on the keyboard 15. When liquid such as coffee is spilled on the keyboard 15 during a user's operation on the notebook personal computer 11, for example, the liquid flows over the surrounding wall 26 of the keyboard 15 from the front surface of the waterproof support plate 25. The overflow of the liquid flows into the gap between the surrounding wall 26 and the rear cover 14c. The edge 17 of the rear cover 14c is received on the surface of the heat radiating plate 31. Even if there is a gap between the edge 17 and the surface of the heat radiating plate 31, the surface tension of the liquid serves to prevent the liquid from immediately leaking outside the window opening 18 through the gap between the edge 17 and the surface of the heat radiating plate 31.

The liquid then starts gradually leaking outside the window opening 18, or leaking into the inner space of the enclosure 14, through the gap between the heat radiating plate 31 and the edge 17. The wall 32 of the heat radiating wall 31 blocks the liquid. The liquid is gradually accumulated in a space between the edge 17 and the wall 32. It takes a while before the liquid flows over the wall 32 in this manner. Immersion of the motherboard 36 is delayed. In the case where the user is creating data such as a document file with application software, for example, the data can be saved prior to the immersion. The data can be prevented from being lost.

Likewise, when liquid such as coffee is spilled on the keyboard 15 during a user's operation on the notebook personal computer 11, for example, the liquid flows over the surrounding wall 26 of the keyboard 15 from the front surface of the waterproof support plate 25. The overflow of the liquid flows into the gap between the surrounding wall 26 and the front cover 14b. The edge 17 of the front cover 14b is received on the surface of the front metal member 51 (the side metal member 52). Even if there is a gap between the edge 17 and the front metal member 51, the surface tension of the liquid serves to prevent the liquid from immediately flowing outside the window opening 18, or flowing into the inner space of the enclosure 14, through the gap between the edge 17 and the front metal member 51.

The liquid then starts gradually leaking outside the window opening 18, or leaking into the inner space of the enclosure 14, through the gap between the surface of the front metal member 51 and the edge 17. The wall 53(54) blocks the liquid. The liquid is gradually accumulated in a space between the edge 17 and the wall 53. It takes a while before the liquid flows over the wall 53. Immersion of the motherboard 36 is delayed. In the case where the user is creating data such as a document file with application software, for example, the data can be saved prior to the immersion. The data can be prevented from being lost.

The liquid accumulated between the surrounding wall 26 and the wall 32 may be wiped off later, for example. The rear cover 14c may be removed so that the liquid can be wiped off, for example. Likewise, the liquid accumulated between the surrounding wall 26 and the wall 53 may be wiped off later, for example. The front cover 14b may be removed so that the liquid can be wiped off. In such a case, the keyboard 15 may also be removed. The remnant of the liquid on the front surface of the waterproof support plate 25 can thus be wiped off.

If the liquid spills over the wall 32 or the wall 53(54), the motherboard 36 would suffer from immersion. A short circuit would be caused on the motherboard 36. The CPU chip would duffer from damages, for example. The processing based on the operating system would fail. The notebook personal computer 11 would correspondingly fail, for example. In such a case, the user can ask the manufacturer or a distributor for a repair service, for example. The manufacturer or distributor would replace the motherboard 36 with new one, for example.

Figure 7:
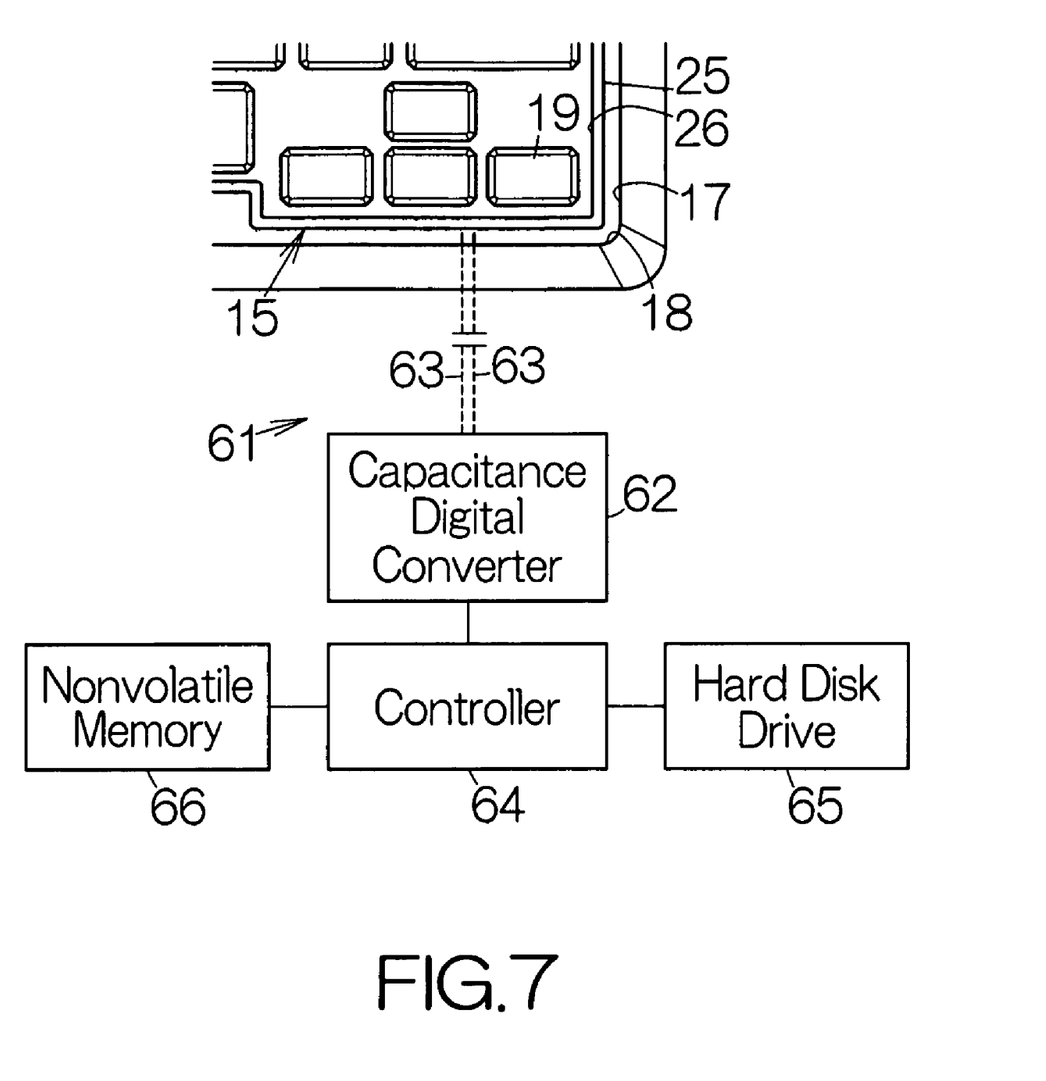
FIG. 7 is a block diagram schematically illustrating a controller circuit incorporated in the main body.

As shown in FIG. 7, a detection circuit 61 may be incorporated in the notebook personal computer 11 at a position inside the window opening 18 for detection of liquid. The detection circuit 61 includes a capacitance digital converter (CDC) 62 mounted on the printed wiring board 37, and a pair of signal lines 63, 63 connected to the capacitance digital converter 62, for example. The signal lines 63 may be formed on a flexible printed wiring board, for example. The tip ends of the signal lines 63, 63 are exposed between the surrounding wall 26 of the keyboard 15 and the edge 17. The capacitance digital converter 62 serves to detect liquid with the assistance of the signal lines 63, 63 as described later in detail.

A controller circuit, namely a controller 64, is connected to the capacitance digital converter 62 so as to control the operation of the capacitance digital converter 62. The controller 64 allows establishment of a predetermined silent or sleeping state of the notebook personal computer 11 as described later in detail. The controller 64 may be mounted on the printed wiring board 37, for example. A hard disk drive (HDD) 65 and a nonvolatile memory 66 are connected to the controller 64, for example. A flash memory may be employed as the nonvolatile memory 66, for example. The controller 64 enables control on the operation of the hard disk drive 65. The controller 64 also allows temporarily storing data in the nonvolatile memory 66.

Now, assume that liquid such as coffee is spilled on the keyboard 15. The liquid flows over the surrounding wall 26 of the keyboard 15 from the front surface of the waterproof support plate 25 as described above. The overflow of the liquid flows into the gap between the surrounding wall 26 and the edge 17. It takes a while before the liquid flows outside the window opening 18, or flows into the inner space of the enclosure 14, through the gap between the surface of the heat radiating plate 31 and the edge 17. The tip ends of the signal lines 63, 63 get wet with the liquid. A capacitance changes at the signal lines 63, 63. The capacitance digital converter 62 detects the liquid in response to such a change in the capacitance. The capacitance digital converter 62 outputs a detection signal to the controller 64.

The controller 64 operates to establish a predetermined silent or sleeping state of the hard disk drive 65 in response to the detection signal. The operation of the hard disk drive 65 is forcefully stopped. A head slider is unloaded to a predetermined unload position. A so-called ramp member is employed to hold the head slider at a position outside a magnetic recording disk, for example. The head slider is in this manner reliably prevented from collision against the magnetic recording disk and the head slider. If a power supply is accidentally turned off during the operation of the hard disk drive 65, for example, the magnetic recording disk would stop rotating while the head slider flies above the magnetic recording disk. The head slider would thus inevitably collide against the surface of the magnetic recording disk.

The data to be written may temporarily be stored in the nonvolatile memory 66 for unload of the head slider, for example. Even if the detection signal is supplied to the controller 64 during a writing process of the data, the data to be written is reliably protected in this manner. The data can reliably be recovered. Such a writing process of data may be controlled based on the operation of the controller 64.

What is claimed is:

1. An electronic apparatus comprising:
   an enclosure having an edge for defining a window opening;
   a keyboard set in the window opening along the edge of the enclosure;
   a support member attached to the enclosure from an inside of the enclosure, the support member having a surface receiving the edge of the enclosure and the keyboard; and
   a wall standing upright from the surface of the support member at a position outside the window opening.

2. The electronic apparatus according to claim 1, wherein the keyboard includes:
   keypads arranged along a plane;
   a waterproof support plate supporting the keypads; and
   a surrounding wall standing upright from an outer periphery of the waterproof support plate.

3. The electronic apparatus according to claim 2, wherein the edge of the enclosure is placed at a position between the wall of the support member and the surrounding wall of the waterproof support plate.

4. The electronic apparatus according to claim 1, further comprising a heat generating component placed below the support member, wherein the support member is a heat radiating plate designed to radiate heat generated at the heat generating component.

5. The electronic apparatus according to claim 1, further comprising a heat generating component connected to the support member, wherein the support member is a heat radiating plate designed to radiate heat generated at the heat generating component.

6. The electronic apparatus according to claim 1, further comprising a detection circuit designed to detect liquid inside the window opening.

7. The electronic apparatus according to claim 6, further comprising a controller circuit establishing a silent state of the electronic apparatus when the detection circuit detects liquid.

8. The electronic apparatus according to claim 7, further comprising a hard disk drive, wherein the controller circuit establishing a silent state of the hard disk drive when the detection circuit detects liquid.

9. An electronic apparatus comprising:
   an enclosure having an edge for defining a window opening, the window opening receiving a keyboard therein;
   a support member attached to the enclosure from an inside of the enclosure, the support member having a surface receiving the edge and the keyboard; and
   a wall standing upright from the surface of the support member at a position outside the window opening.

* * * * *